United States Patent [19]

Hostetler et al.

[11] 4,356,369

[45] Oct. 26, 1982

[54] GUARD APPARATUS

[75] Inventors: Thomas E. Hostetler, New Carlisle; Ted J. Ellis, Jr., Goshen, both of Ind.

[73] Assignee: Bristol Corporation, Elkhart, Ind.

[21] Appl. No.: 233,926

[22] Filed: Feb. 12, 1981

[51] Int. Cl.³ .................. H01H 9/20; H01H 3/20
[52] U.S. Cl. .................. 200/334; 200/153 T; 200/332; 200/335; 200/153 LB
[58] Field of Search ............ 200/334, 153 T, 47, 200/153 A, 153 H, 153 LB, 330, 332, 339

[56] References Cited

U.S. PATENT DOCUMENTS

| | | | |
|---|---|---|---|
| 3,156,134 | 11/1964 | Forrester, Jr. | 200/330 |
| 3,210,507 | 10/1965 | Kadisevskis et al. | 200/332 |
| 3,248,508 | 4/1966 | Pastorel | 200/334 |
| 4,154,995 | 5/1979 | Kantarian et al. | 200/332 |
| 4,181,827 | 1/1980 | Dieprueen | 200/153 T |
| 4,215,257 | 7/1980 | Repplinger | 200/153 T |

Primary Examiner—Willis Little
Attorney, Agent, or Firm—Marmaduke A. Hobbs

[57] ABSTRACT

A guard apparatus for production machines having hazardous work areas in which injury to the machine operator can occur, in which a guard rod is disposed around the perimeter of the hazardous work area and is attached on one end to an emergency circuit activation mechanism connected by an electric circuit to the emergency stop circuitry of the machine. If the guard rod is deflected either upwardly or downwardly, a switch in the activation mechanism is tripped, causing the emergency circuitry of the machine to go into an emergency off condition, thereby stopping the machine. A second emergency circuit activation mechanism can be connected to the other end of the guard rod to provide a back-up for the operation of the guard apparatus if the first switch fails.

12 Claims, 7 Drawing Figures

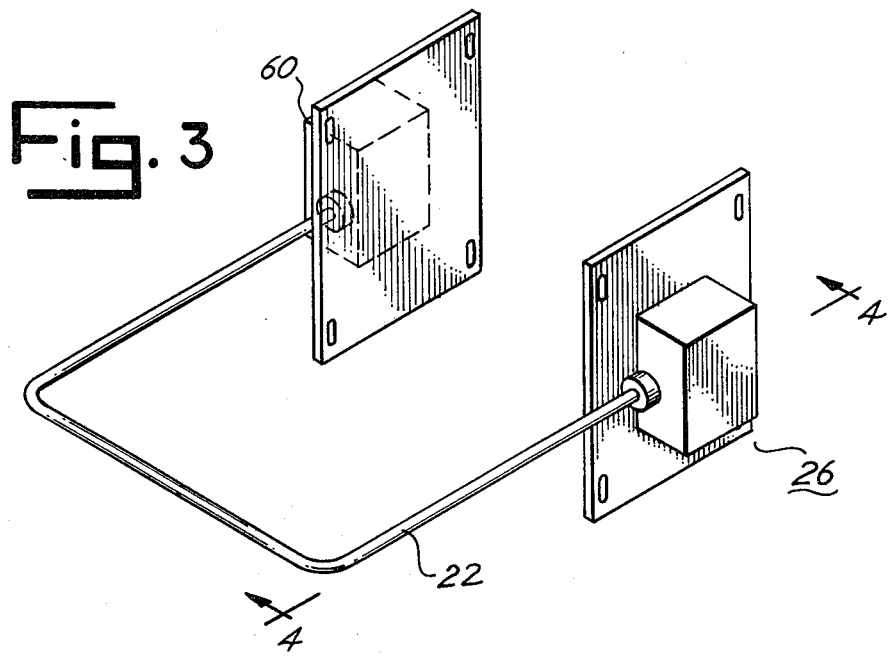
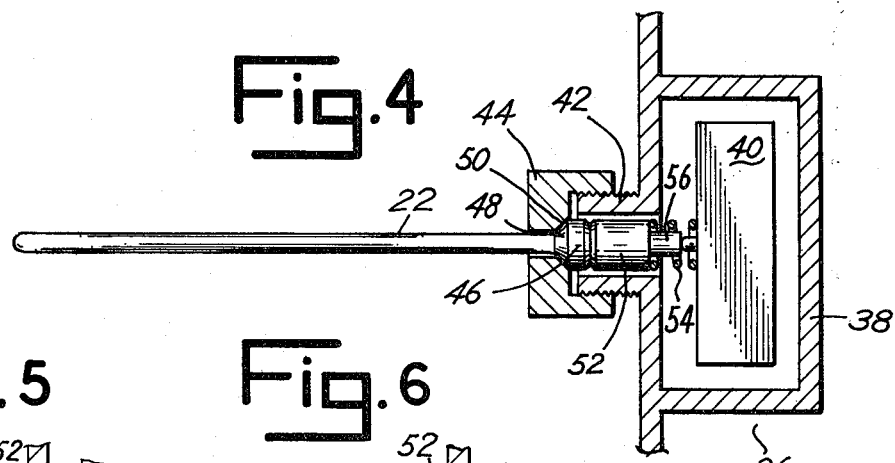
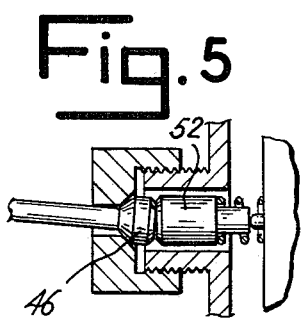
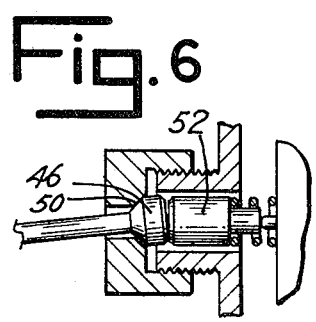

GUARD APPARATUS

BACKGROUND OF THE INVENTION

Many types of production machines have inherent dangers associated with the operation thereof, in that manual manipulation of materials is required near moving parts of the machine. An example of a production machine with inherent dangers to the machine operator is an injection molder. It is conventional in injection molders to have upper and lower mold pieces which are brought together and receive injected materials from an injection ram. The injection molders often are programmed with automatic cycles so that, after the machine operator has depressed a foot pedal or otherwise activated the machine cycle, the mold closes, material is injected into the mold, the material is cured for an appropriate length of time and the mold opens automatically. Normally, a single, brief depression of the foot pedal will start the cycle, and the cycle will continue uninterrupted until it is completed, even if the pedal is released.

In some molding processes the machine operator must place articles into the mold and hold the articles in position as the mold closes. For example, in the fabrication of many different types of electrical devices, such as cords, heating cables and electrical fittings, it is necessary to place terminals, wires or the like into the mold and to hold them in the proper position during the initial stages of the cycle of the machine. The operator of the mold is required to manipulate the articles very close to the upper and lower mold pieces. Since the mold is held together forcefully during the injection and curing steps, if the mold operator accidentally places his hands between the mold pieces as the mold is closing, the operator can be severely injured.

Although the inexperienced mold operator may appear to be the most likely one to suffer injury, these types of accidents can also occur to the experienced mold operator. It occasionally happens that the articles being held in the mold by the operator become misplaced as the mold is closing, and the natural reaction of the operator is to quickly reposition the materials. In doing so, even an experienced mold operator can unintentionally place his fingers in the hazardous area between the upper and lower mold pieces. It is also known that, after prolonged repetitive work such as operating an injection molder, an experienced operator can become inattentive in the operation of the machine. The steps of the procedure become mechanical, and overfamiliarity with the operation of the machine can lead to carelessness. Injury can occur to the experienced operator as frequently as to an inexperienced novice operator who, because of his lack of experience may be somewhat fearful of the machine and therefore, is more careful than the experienced operator.

It is known in the prior art to include emergency stop circuitry in production equipment such as injection molders, so that the operating cycle of the machine can be interrupted at any time by depressing an emergency stop button. When the emergency circuitry is activated, regardless of the stage of operation, the mold opens and sequences to the start of a new cycle, normally with the upper and lower mold pieces separated. Thus, if the operator is aware that the materials are mispositioned in the mold, rather than endangering himself, the proper procedure is to depress the emergency stop button and stop the operating cycle. Unfortunately, this is not always the procedure followed under the circumstances.

It is also known in the prior art to provide guards on production equipment such as molding machines, which include guard levers that are tilted either up or down by improperly placed articles or by the presence of the operator's hands in the hazardous work area. The guards known in the prior art have not been wholly satisfactory, however, in that they have not been sufficiently sensitive to adequately protect the worker and have been electrically connected with the foot pedal activating circuitry. Thus, even if the guard levers are moved sufficiently to trigger the protective feature the previous guard devices only prevent the initiation of a new processing cycle, so that depression of the foot pedal is ineffective in starting the cycle until the guard lever is returned to its neutral position. The previous systems have not, however, interrupted the operating cycle of the machine once it has begun. Thus, if the machine operator starts the cycle and then places his hand in the hazardous area, the cycle will continue unless the emergency stop button is depressed, which frequently is done, if at all, only after the injury has occurred.

SUMMARY OF THE INVENTION

It is a principal object of the present invention to provide a guard apparatus for production equipment which will substantially reduce the risk of injury to machine operators by interrupting the operating cycle of the production machine at any stage of operation if danger to the operator exists, and which detects the presence of small or relatively thin articles in the hazardous work area and stops the production cycle of the machine when the presence of such articles is detected.

Another object of the present invention is to provide a guard apparatus for production machines which will cause both the experienced machine operator and the novice operator to exercise more care in operating the machine by making the operators aware of potential danger, and which can be constructed in shapes to completely and fully protect the worker from the hazardous working area on most production machines, regardless of the shape of the area.

A further object of the present invention is to provide a guard apparatus for production machines which has redundancy so that malfunction of parts of the guard will not render the guard ineffective and endanger the machine operator, and which can be installed on production machines with a minimal amount of modification of the machines.

These and other objects are accomplished in the present invention by providing a guard rod which surrounds the perimeter of the hazardous work area of the machine, with at least one end of the guard being connected to a switch, preferably a microswitch, by a plunger which, upon only a minimal deflection of the guard rod, either upwardly or downwardly, trips the microswitch. The microswitch is connected to the emergency stop circuitry of the production machine so that when the guard is in the neutral position, the machine will operate. Once the guard is deflected in either direction, and the microswitch either opened or closed, depending upon the necessary electrical connections, the emergency stop circuit in the machine is activated to stop the machine and sequence it to the beginning of a new cycle. Redundancy may be provided by having two or more of the microswitch connections.

Additional objects and advantages of the present invention will become apparent from the following detailed description and the accompanying drawings.

BRIEF DESCRIPTION OF THE DRAWINGS

FIG. 3 is a perspective view of a modified form of the guard apparatus;

FIG. 4 is a cross sectional view of the guard apparatus shown in FIG. 3, taken on line 4—4 of the latter figure;

FIG. 5 is a fragmentary cross sectional view similar to that shown in FIG. 4, but having the guard rod in the upwardly deflected position;

FIG. 6 is a cross sectional view similar to FIGS. 4 and 5, but showing the guard rod in the downwardly deflected position; and FIG. 7 is a box diagram illustrating the sequence of operation of the present invention.

DETAILED DESCRIPTION OF THE PREFERRED EMBODIMENT

Figure 1:
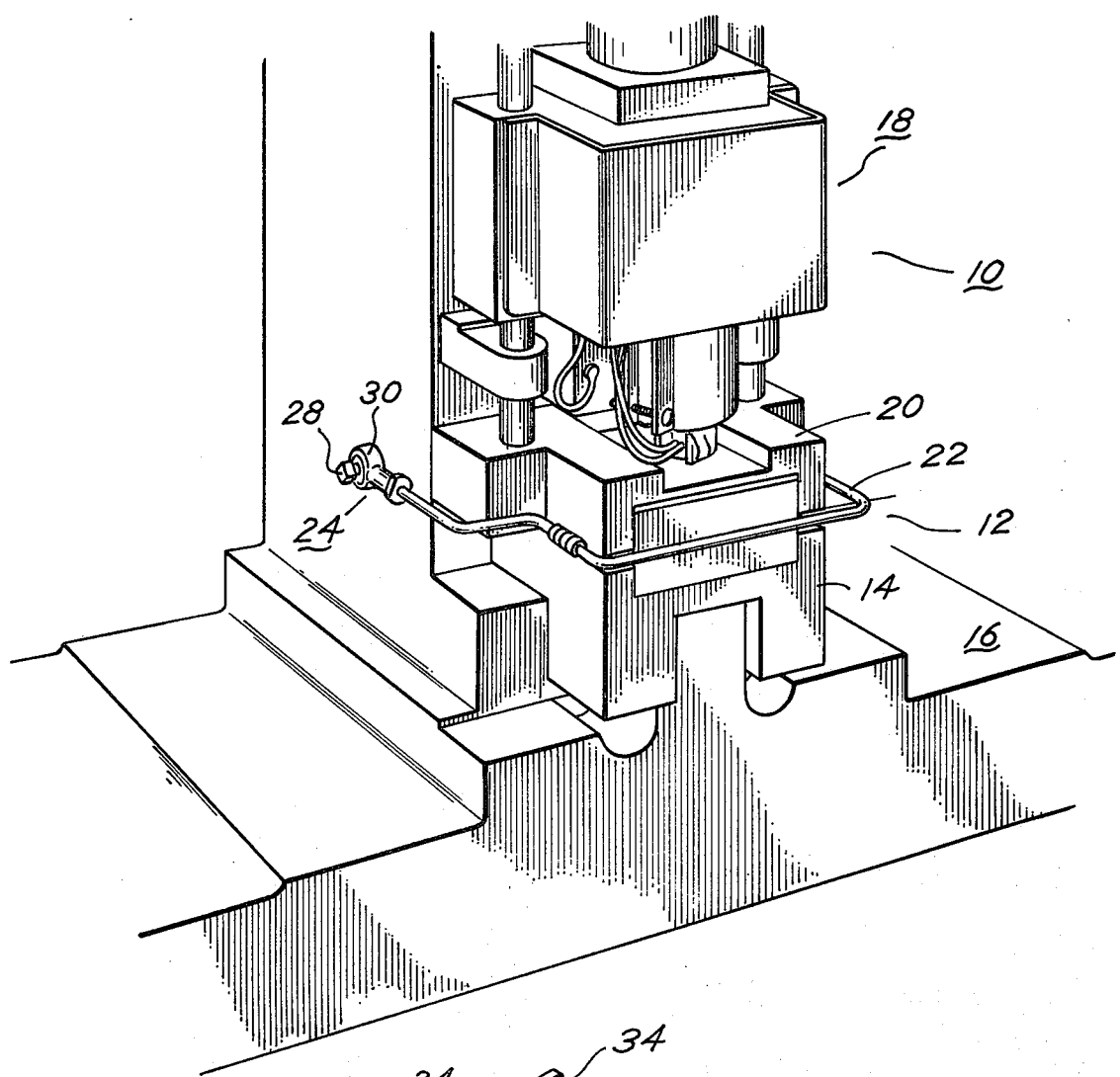
FIG. 1 is a perspective view of a single shot injection molder having a guard apparatus embodying the present invention.

Referring now more specifically to the drawings, and to FIG. 1 in particular, numeral 10 designates a single shot injection molder having a guard apparatus 12 embodying the present invention for protecting the mold operator from the hazardous work areas in the injection molder, where injury to the mold operator could occur. The present guard apparatus may be used advantageously on other production machines without substantial modifications, and the single shot injection molder shown in FIG. 1 is merely one example of a machine on which the present apparatus may be used advantageously to protect the operator of the machine. Injection molder 10 includes a lower mold 14 which is stationary with respect to base 16 of the molder and has cavities into which material is injected during the molding process. The material is injected from an injection ram 18 disposed above the lower mold piece and operating with an upper mold piece 20 which moves upwardly and downwardly with respect to lower mold piece 14, to mate with the lower mold piece at the start of each operating cycle.

Figure 2:
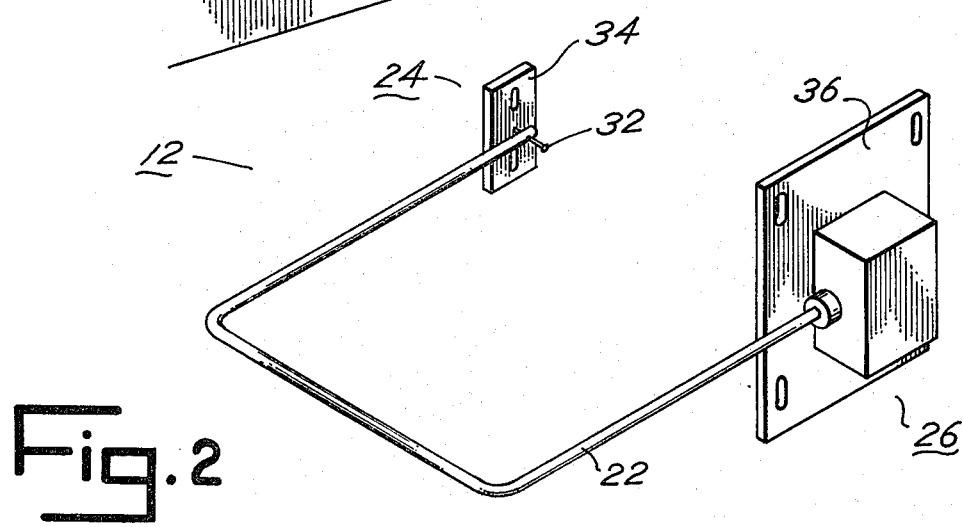
FIG. 2 is a perspective view of a guard apparatus apart from the production machine.

Guard apparatus 12 includes a guard rod 22 disposed around the perimeter of the hazardous work area of the production machine and connected on one end to a pivot apparatus 24 and on the other end to an emergency circuit activation assembly 26. Guard rod 22 may be made in virtually any desirable shape to protect the worker from the hazardous work area of the machine. For example, the rod shown in FIG. 1 has several corners and bends to conform to the outline of the upper and lower mold pieces, to protect the worker from the front and sides of the mold by stopping the machine if the operator accidentally places his hand or arm in the hazardous work area between the mold pieces. In some uses the guard rod may be a simple rectangle as shown in FIGS. 2 and 3, or may be partially circular or in other geometric shapes to protect the worker from the dangerous machine parts.

The construction of pivot apparatus 24 may vary, depending upon the machine on which the guard apparatus is installed. For example, as shown in FIG. 1, a bolt 28 disposed through a collar 30 on the end of rod 22 can be used to attach the rod directly to the production machine. In other situations a pin 32, as shown in FIG. 2, may be used to attach the rod to a plate 34 which is attached to the machine. The type and location of pivotal connection to be used depends upon the areas on the machine available for attachment of the guard to the production machine, and on the relationship between the suitable attachment area and the hazardous work area of the machine.

The emergency circuit activation assembly 26 can also be attached directly to the machine or to a plate 36 which is attached to the machine. The activation assembly includes a housing 38 having disposed therein a switch 40, which preferably is a microswitch or other similar device requiring only a short activation stroke. An externally threaded annular flange 42 extends from the housing and a nut 44 is threadable thereon. Rod 22 extends through nut 44 and has an enlarged end 46 which prevents the withdrawal of rod 22 from nut 44 when the nut is attached to flange 42. A tapered surface 48 on enlarged end 46 seats on a tapered interior wall 50 of nut 44, and the enlarged end extends partially into annular flange 42. A plunger 52 is disposed between enlarged end 46 and microswitch 40, and a spring 54 is disposed around a reduced end 56 of the plunger, between the main body of the plunger and microswitch 40. Adjustment of nut 44 inwardly or outwardly on threaded flange 42 increases or decreases the pressure of the plunger on the microswitch when rod 22 is in the neutral position. Movement of rod 22 upwardly or downwardly causes enlarged end 46 of the rod to tilt, hence moving plunger 52 toward microswitch 40.

Microswitch 40 is connected to a relay which is connected to the existing emergency circuitry of the machine. The relay is selected to be compatible with the emergency circuitry in the machine and will have a number of normally opened poles and normally closed poles to be compatible with the number of normally opened and normally closed circuits in the emergency circuitry. It is preferred that the relay be in an energized state during operation of the machine, so that if the relay fails and de-energizes, the machine will automatically go into an emergency off condition, just as when the guard rod is deflected and trips microswitch 40 to cause the existing emergency circuitry of the machine to go into an emergency off phase. Hence, the machine will be stopped at any time during the operation thereof if rod 22 is deflected, the same as if the emergency stop button was depressed. In a machine such as an injection molder, the upper mold piece will sequence to the beginning of the next phase and the mold will open when the machine is in emergency off. Thus, the risk of injury to a molding machine operator is substantially reduced by use of the present guard.

In the use and operation of a guard apparatus embodying the present invention, the guard rod 22 is selected to have a shape to protect the worker from the hazardous area of the machine and is disposed generally around the hazardous area. In an injection molder as shown in FIG. 1, the guard rod will be mounted on the machine so that pieces which must be inserted into the mold cavity can be placed either under or over the guard rod without deflecting the rod. The preferred arrangement is to dispose the guard rod slightly above the upper surface of the lower mold piece so that the product parts can be inserted beneath the guard rod; however, the rod should not be positioned so high that an inadvertently placed finger will not deflect the rod.

Pivotal attachment apparatus 24 is attached to the machine on one side of the rod, and the emergency circuit activation assembly is attached to the machine on the other side of the rod. The guard rod will automatically assume a neutral position because of the tapered surface 48 on enlarged end 46 and the corresponding tapered wall 50 in nut 44. If the guard rod is deflected either upwardly or downwardly, the rod will automatically return to the centered neutral position when the intruding object is removed.

When placing objects into the mold cavity, if the operator accidentally places his hand beneath the rod and between the upper and lower mold pieces, the rod will be moved upwardly as shown in FIG. 5. Plunger 52 moves inwardly slightly toward microswitch 40, and trips the microswitch. When the microswitch is tripped the relay is de-energized, causing the existing emergency circuitry to go into an emergency off phase. When the machine is stopped by the emergency circuit, a new production cycle cannot be initiated until the operator intentionally actuates the machine's cycling switch (such as a foot pedal switch).

The same operating sequence will happen if the guard rod is moved downwardly by errantly placed objects on top of the guard rod. As shown in FIG. 6, when the rod is moved downwardly, plunger 52 is again moved toward microswitch 40 and trips the switch. The amount of deflection of rod 22 which is required to trip the microswitch is controlled by adjustment of nut 44. Hence, when nut 44 is moved farther onto annular flange 42, the pressure on the microswitch is increased and the required deflection of rod 22 to trip the microswitch is decreased. If nut 44 is moved outwardly on flange 42, a greater deflection of the rod is required to trip the microswitch.

To provide redundancy to the apparatus, pivot apparatus 24 can be replaced with a second emergency circuit activation assembly 60, which is wired into the existing emergency circuitry of the machine. Hence, even if the microswitch in assembly 26 fails, the guard apparatus will continue to operate as required through the operation of the microswitch in assembly 60. As previously mentioned, the system is protected from malfunction of the relay if the relay is in a normally energized phase during operation, so that relay failure causes a de-energization of the circuit, and causes the machine to go into an emergency off condition. With such an emergency circuit failure, the machine cannot be started again until the emergency circuitry is repaired. Until the intruding object which causes the deflection of the guard rod is removed, the machine will not start. Without the present guard apparatus, many production machines can be reset and restarted when intruding objects remain in the hazardous work area, thus increasing the risk of injury.

The relay used with the present machine can be selected to be compatible with whatever type of emergency circuitry is present in the machine. Thus, the number of poles and the condition of the switches, i.e. being either normally opened or normally closed, will depend upon the type of emergency circuitry in the machine. The amount of movement required of the guard rod to trip the microswitch is readily controlled by adjustment of nut 44. In some applications it may be desirable to trip the emergency circuit and microswitch by only a minor deflection of the guard rod while in other circumstances a much more pronounced deflection of the guard rod should be tolerated. The present guard apparatus can be adjusted to accommodate both needs.

Although one embodiment and several modifications of a guard apparatus for injection molders and other production machines have been shown and described in detail herein, various other changes may be made without departing from the scope of the present invention.

We claim:

1. A guard apparatus for production machines having an emergency stop circuit and hazardous work areas in which injury to workers can occur, comprising a guard rod disposed generally horizontally around the perimeter of the hazardous work area of the machine, including a guard section and an angularly moveable end section, pivot means supporting said angularly moveable end section, an activation mechanism connected to said end section of said rod, a switch disposed in said mechanism and operated by pivotal movement of said one rod end section in angular opposite directions, a resilient means urging said rod to a central position, an electric circuit connecting said switch to the emergency stop circuit of the machine, and means for connecting said rod to said switch so that upward or downward deflection of said rod sections from said central position trips said switch for interrupting the operation of the machine through said electric circuit and the emergency stop circuit.

2. A guard apparatus for production machines as defined in claim 1 in which said switch is a microswitch and the other end of said rod is pivotally connected to the machine.

3. A guard apparatus for production machines as defined in claim 2 in which said means for connecting said rod to said microswitch includes said pivot means, a plunger disposed between said pivot means and said microswitch, and in which said pivot means includes an enlarged end on said rod for moving said plunger toward said microswitch when said rod is deflected, and a housing enclosing said enlarged end, said plunger and said microswitch.

4. A guard apparatus for production machines as defined in claim 1 in which said rod has a second angularly moveable end section, pivot means supporting said second end section, an activation mechanism is provided for each of said end sections, said mechanism includes a microswitch operated by the movement of said rod, and said electric circuit connects each of said microswitches to the emergency stop circuit of the machine.

5. A guard apparatus for production machines as defined in claim 4 in which said means for connecting said rod to said microswitches includes pivot means, plungers disposed between said rod and said microswitches, and in which said pivot means include enlarged ends on said rod, and a housing for each of said mechanisms enclosing said respective enlarged end, said plunger and said microswitch on each side.

6. A guard apparatus for production machines as defined in claim 5 in which said rod is irregularly shaped to correspond to at least three sides of the hazardous work area of the machine.

7. A guard apparatus for production machines as defined in claim 1 in which said means for connecting said rod to said switch includes a plunger disposed between said pivot means and said switch, and in which said pivot means includes an enlarged end on said rod for moving said plunger toward said switch when said rod is deflected, and a housing enclosing said enlarged end, said plunger and said switch.

8. A guard apparatus for production machines as defined in claim 7 in which said electric circuit includes a relay which is energized when the machine is operating and is de-energized to stop the machine.

9. A guard apparatus for production machines as defined in claim 7 in which said housing includes an externally threaded annular flange, said plunger is disposed in said annular flange and extends into said housing against said switch, and a nut is disposed on said rod and has threads for engaging the threads on said flange to hold said enlarged end against said plunger.

10. A guard apparatus for production machines as defined in claim 9 in which a tapered wall defines a cavity on the inside of said nut, and a tapered portion of said enlarged end seats in said cavity to center said rod in a neutral position.

11. A guard apparatus for production machines as defined in claim 10 in which a spring is disposed between said plunger and said switch.

12. A guard apparatus for production machines as defined in claim 1 in which said electric circuit includes a relay which is energized when the machine is operating and is deenergized to stop the machine.

* * * * *